United States Patent [19]
Kohno

[11] Patent Number: 5,787,824
[45] Date of Patent: Aug. 4, 1998

[54] METHOD FOR PLANTING GEL-COATED SEEDS

[75] Inventor: Yasushi Kohno, Shizuoka, Japan

[73] Assignee: Yazaki Corporation, Tokyo, Japan

[21] Appl. No.: 675,625

[22] Filed: Jul. 3, 1996

[30] Foreign Application Priority Data

Jul. 7, 1995 [JP] Japan ................................. 7-172428

[51] Int. Cl.⁶ ..................................................... A01L 5/00
[52] U.S. Cl. ........................... 111/14; 111/900; 111/917; 47/74; 47/57.6
[58] Field of Search ................................. 111/100, 900, 111/905, 915, 917, 918, 14; 47/74, 58, 57.6

[56] References Cited

U.S. PATENT DOCUMENTS

| | | | |
|---|---|---|---|
| 1,446,113 | 2/1923 | Blackwell | 47/74 |
| 1,735,835 | 11/1929 | McCallum | 111/915 X |
| 3,331,155 | 7/1967 | Chancellor | 47/74 |
| 3,636,897 | 1/1972 | Brink | 111/77 |
| 3,844,987 | 10/1974 | Clendinning et al. | 47/74 X |
| 3,961,445 | 6/1976 | Rack | 47/74 |
| 3,990,180 | 11/1976 | Bunting | 47/74 |
| 3,992,814 | 11/1976 | Hagner et al. | 111/915 X |
| 4,058,067 | 11/1977 | Wright et al. | 111/1 |
| 4,130,072 | 12/1978 | Dedolph | 111/900 X |
| 4,196,543 | 4/1980 | Dedolph | 47/74 X |
| 4,213,273 | 7/1980 | Dedolph | 47/74 |
| 4,408,550 | 10/1983 | Ellis | 111/100 |
| 4,436,039 | 3/1984 | Stephens, Jr. | 111/100 |
| 4,632,284 | 12/1986 | Erazo et al. | 222/615 |
| 5,060,418 | 10/1991 | Pullman et al. | 111/100 X |
| 5,080,925 | 1/1992 | Kouno | 427/4 |
| 5,254,358 | 10/1993 | Kouno et al. | 427/4 |
| 5,421,882 | 6/1995 | Kouno et al. | 118/23 |
| 5,509,963 | 4/1996 | Kohno | 118/23 |
| 5,512,101 | 4/1996 | Kohno | 118/668 |
| 5,609,684 | 3/1997 | Ido et al. | 118/13 |

FOREIGN PATENT DOCUMENTS

| | | |
|---|---|---|
| 0097735 | 11/1984 | European Pat. Off. . |
| 1454-278-A | 1/1989 | U.S.S.R. ............... 111/915 |
| 2233540 | 1/1991 | United Kingdom . |
| WO 87/01258 | 3/1987 | WIPO ............... A01C 1/06 |
| WO8701258 | 12/1987 | WIPO . |

*Primary Examiner*—Terry Lee Melius
*Assistant Examiner*—Victor Batson
*Attorney, Agent, or Firm*—Sughrue, Mion, Zinn, Macpeak & Seas, PLLC

[57] ABSTRACT

A method of planting gel-coated seeds comprising previously making the seeds sprout a root and then sowing the seeds with the tip of the root facing downward.

3 Claims, 4 Drawing Sheets

1

METHOD FOR PLANTING GEL-COATED SEEDS

FIELD OF THE INVENTION

The present invention relates to a method for planting gel-coated seeds of plants in the ground or seedbeds.

BACKGROUND OF THE INVENTION

It is known that coating of seeds individually with gel facilitates planting the seeds in the ground and is effective to accelerate germination as described in WO 87/01258. The inventors of the present invention have participated in the development of this technique and made various inventions as disclosed, e.g., in JP-A-63-209502 (the term "JP-A" as used herein means an "unexamined published Japanese patent application"), JP-A-63-68008, and JP-A-5-56707.

The techniques we have proposed comprise coating seeds with gel, which is insolubilized in water by metal ions, e.g., calcium ion, so as to have a uniform size and an appropriately controlled hardness. The techniques have made it feasible to mechanize sowing of even those seeds that are too small to be sown mechanically.

The gel-coated seeds are incubated at a suitable temperature for germination acceleration to be previously made to germinate (the terminology "germinate" as used herein is intended to include sprouting of a root) and then directly planted in a piece of ground or seedbeds by means of a sowing machine (called a seed drill).

Although gel-coated seeds have a high rate of germination as compared with uncoated seeds, they show wide variations in time of emergence above the ground after planting (hereinafter referred to as budding); that is, seedlings show poor uniformity in degree of growth. It tends to follow that the harvest time widely varies, causing considerable reduction of labor efficiency. The tendency is particularly conspicuous in the case where the period for germination acceleration is long.

Furthermore, some kinds of gel-coated seeds exhibit a low rate of budding.

Gel-coated seeds are almost spherical, and no consideration has been given to which part of the seeds should face upward when they are planted with a seed drill. In this regard, the inventors of the present invention studied gelcoated seeds which have been germinated within their gel coat by a germination accelerating treatment.

FIG. 4(a) illustrates germinated gel-coated seed 2. Root 3 grows in gel coat 1. In general, gel-coated seeds are planted while the tip of the root is within the gel coat as in FIG. 4(a), i.e., before the root sticks out of the gel coat.

After planting, the root sticks out of the gel coat and grows in soil 4. If a germinated gel-coated seed is planted with the tip of its root downward as shown in FIG. 4(b), the root continues growing, and a shoot grows above the ground with no hindrance.

However, if the seed is planted with the tip of its root upward as shown in FIG. 4(c) (4: soil), it has been revealed that the root turns down within the gel coat because of its positive geotropism. In this case, it takes much time for the root to stick out of the gel coat. In particular, very small seeds, which are often coated with gel for easy mechanical planting, tend to fail to bud because their energy is exhausted before sticking out. Moreover, if the time before sticking out is prolonged, the water content of the gel coat will be consumed to harden the coat, making it difficult for the seed to stick the root out. As a result, the rate of budding is reduced.

It was ascertained that the germinated gel-coated seeds, when planted with the root upward, are slow in budding or, in some cases, fail to bud. If the time required for budding is long in this way, the seeds are more susceptible to attack by soil bacteria.

It was also revealed that root crops, such as Japanese radish and Japanese burdock, which have once changed the growing direction of the root are apt to undergo deformation at the turning point, i.e., in the vicinities of the part where leaves are sprouted, and the deformation remains even after their full growth. Root crops suffering from such deformation have a seriously reduced commercial value on the market.

SUMMARY OF THE INVENTION

An object of the present invention is to provide an improved method for planting gel-coated seeds, in which the time required for budding after planting is reduced and a high rate of budding is secured.

This and other objects of the present invention have been accomplished by a method of planting gel-coated seeds comprising previously making the seeds sprout a root and then sowing the seeds with the tip of the root facing downward.

The planting method of the present invention is preferably carried out with the aid of an auxiliary tool.

BRIEF DESCRIPTION OF THE DRAWINGS

FIG. 1 shows an example of the auxiliary tool which can be used in the invention, in which Fig. 1(a) is a perspective view, and FIG. 1(b) is a cross sectional view at the plane containing line I—I.

FIG. 2 shows another example of the auxiliary tool which can be used in the invention, in which FIG. 2(a) is a perspective view, and FIG. 2(b) is a cross sectional view at the plane containing line II—II.

FIG. 4 shows germinated gel-coated seeds, in which FIG. 4(a) is a germinated gel-coated seed, FIG. 4(b) is a germinated gel-coated seed planted in the ground with the tip of its root downward, and FIG. 4(c) is a germinated gel-coated seed planted in the ground with the tip of its root upward.

DETAILED DESCRIPTION OF THE INVENTION

More preferably, gel-coated seeds are each put in an auxiliary tool whose top and bottom can be specified in such a manner that the seed does not rotate therein, subjected to germination acceleration to sprout a root, and then sown while maintaining the top-to-bottom relation in the auxiliary tool.

That is, the present invention can preferably be carried out by using an auxiliary tool whose top and bottom can be specified, in which a gel-coated seed is put in such a manner that the seed may not rotate therein. The gel-coated seed while in the auxiliary tool is subjected to germination acceleration to sprout a root. The root grows downward within the gel coat due to its geotropism. The gel-coated seed thus germinated is then sown while maintaining the top-to-bottom relation in the auxiliary tool whereby the growing force of the root is made full use of, and the root smoothly sticks out. As a result, seeds grow to seedlings with satisfactory uniformity.

A preferred auxiliary tool has a hollow post form, which will not interfere with the growth of a seed. A still preferred auxiliary tool has a hollow cylinder form with its inner diameter of at least one end thereof being smaller than the diameter of the gel-coated seed to be put in, which tool will make it easier to put a gel-coated seed in. Furthermore, the top or bottom of the auxiliary tool may be open or closed.

Figure 1:
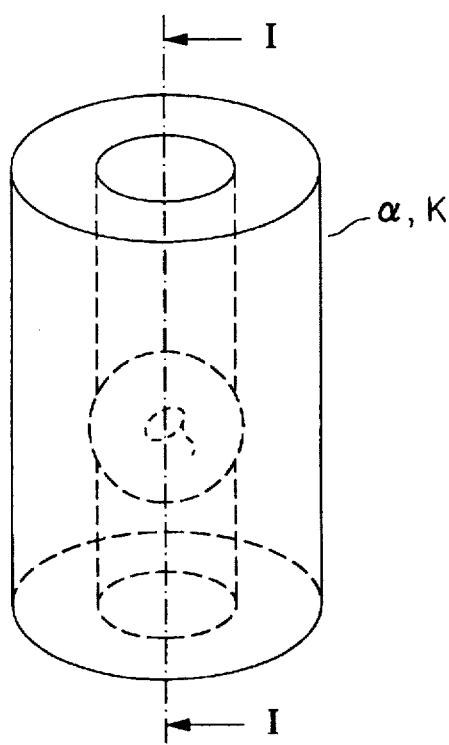
Figure 1:
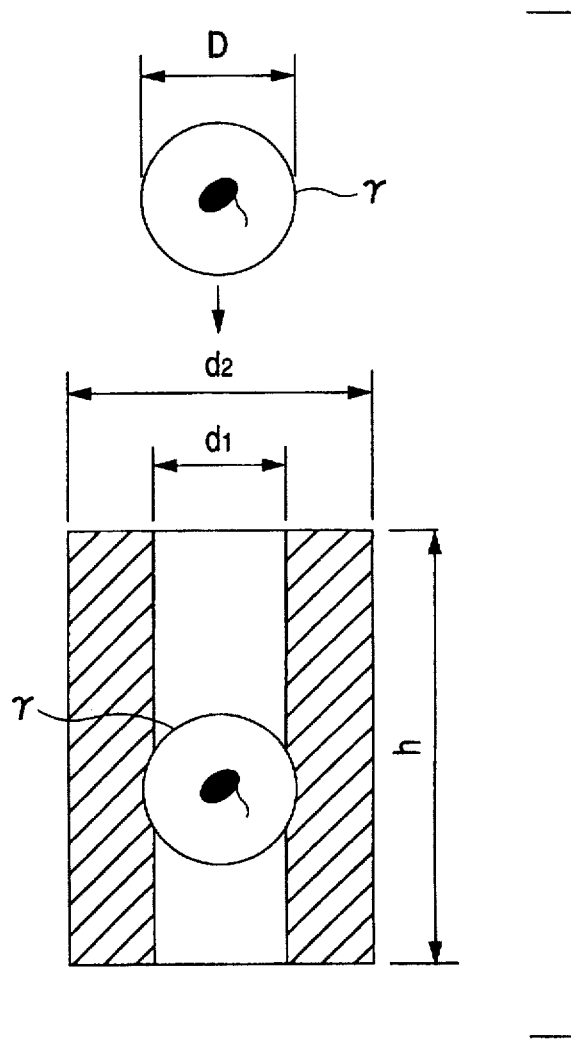
Figure 2:
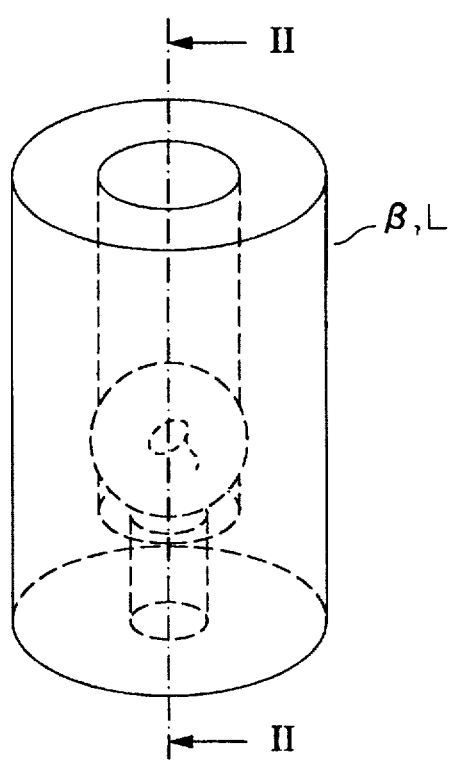
Figure 2:
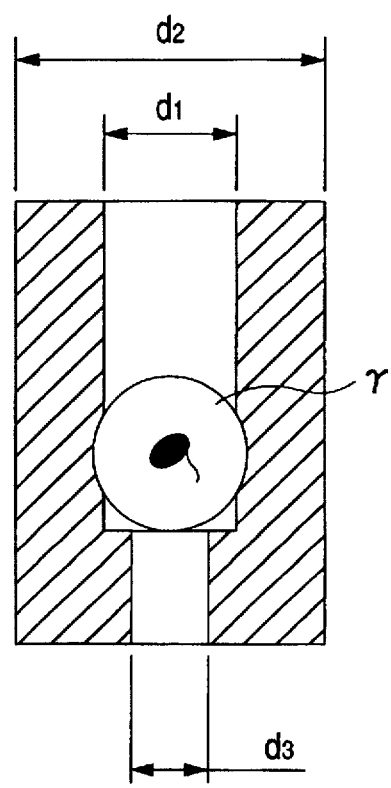

Specific examples of the above-mentioned auxiliary tools include auxiliary tools α and β shown in FIGS. 1 and 2, respectively.

Figs. 1(a) and 1(b) show a perspective view of auxiliary tool a and a cross sectional view of the tool at the plane containing line I—I, respectively. Auxiliary tool α has fixed inner diameter $d_1$ ($\phi d_1$), and outer diameter $d_2$. While inner diameter $d_1$ is slightly smaller than the diameter D ($\phi D$) of gel-coated seed γ to be put in the hollow part ($\phi D > \phi d_1$), because tool α is made of a soft material as hereinafter described and also because gel-coated seed γ is soft, the seed can be put in without rotating as shown in the Figures.

When a gel-coated seed is put in tool α, the position of the bottom of the seed is preferably higher than the bottom end of tool α so that the root coming out of the seed as a result of germination acceleration may not be deformed even if it sticks out of the gel coat. To this effect, the height h of the tool is preferably twice to three times the diameter D of the gel-coated seed. Taking the freedom of root growth into consideration, it is preferable to place a gel-coated seed in the tool with the position of its center corresponding to ⅓ to ½ of the height of the tool from the bottom.

FIG. 2 shows auxiliary tool β which facilitates the above-described positioning of a gel-coated seed. FIGS. 2(a) and 2(b) are a perspective view of auxiliary tool β and a cross sectional view of the tool at the plane containing line II-II, respectively. Auxiliary tool β has outer diameter $d_2$. Auxiliary tool β has a step in the lower part of the hollow portion in such a manner that the inner diameter $d_3$ below the step (hereinafter referred to as a lower inner diameter) is smaller than the inner diameter $d_1$ above the step (hereinafter referred to as an upper inner diameter). Lower inner diameter $d_3$ is preferably ½ or more of the diameter of gel-coated seed γ so as not to interfere with the growth of the root.

Auxiliary tools α and β having their dimensions properly selected are applicable to a transplantation machine widely used today. Therefore, the gel-coated seeds put in these tools can be planted efficiently without purchasing a new machine.

As far as the auxiliary tool used is made of a soft and porous material, it does not interfere with the growth of the plant. The auxiliary tool is preferably made of decomposable materials including those capable of dissolving in water of soil and those decomposable by, e.g., soil microorganisms (so called biodegradable materials); for such decomposable auxiliary tools cause no hindrance to growth of plants nor accumulate in soil to harm plants. Examples of the materials decomposable with water include polyvinyl alcohol (PVA), and examples of the biodegradable materials include natural high polymeric gel, nonwoven fabric of pulp, cotton or rayon, spongy cellulose, and natural sponge. Germination acceleration of gel-coated seeds can be carried out simply by maintaining the gel-coated seeds at a temperature suitable for germination since the water content necessary for germination is supplied from the gel coat.

The invention thus provides a method for planting gelcoated seeds comprising previously making the seeds sprout a root and then planting the seeds with the tip of the root facing downward. The planting method of the invention makes it possible to make effective use of the growth energy of the root and to let the root strike out of the gel coat in the least time. As a result, when a large number of gel-coated seeds are planted in this way, the seeds will grow uniformly to provide seedlings having a regular height. Where a hollow cylindrical auxiliary tool is used in planting seeds of crops, especially root crops, the root does not suffer from deformation, which might be caused by turning of the root and will lessen the commercial value on the market.

The present invention will now be illustrated in greater detail with reference to Examples, but it should be understood that the present invention is not deemed to be limited thereto. Unless otherwise indicated, all percents are by weight.

EXAMPLES 1 AND 2 AND COMPARATIVE EXAMPLES 1 AND 2

Gel-coated seeds of Japanese burdock were prepared as follows. A seed of Japanese burdock was introduced into a droplet of a 3% sodium alginate aqueous solution by means of a capillary. The droplet containing one seed was dropped in a 10% aqueous solution of calcium chloride to prepare a water insolubilized gel-coated seed having a diameter of 10 mm (hereinafter designated gel-coated seed (I)). Thus, 1200 gelcoated seeds (I) were prepared in total.

When 800 gel-coated seeds out of 1400 were subjected to germination acceleration at 22° C. for 24 hours, all of them sprouted a root. In a tray containing horticultural soil were planted 400 gel-coated seeds out of 800 (Example 1) were planted with the tip of their root facing downward, while the other 400 (Comparative Example 1) with the tip of their root facing at random.

Figure 3:
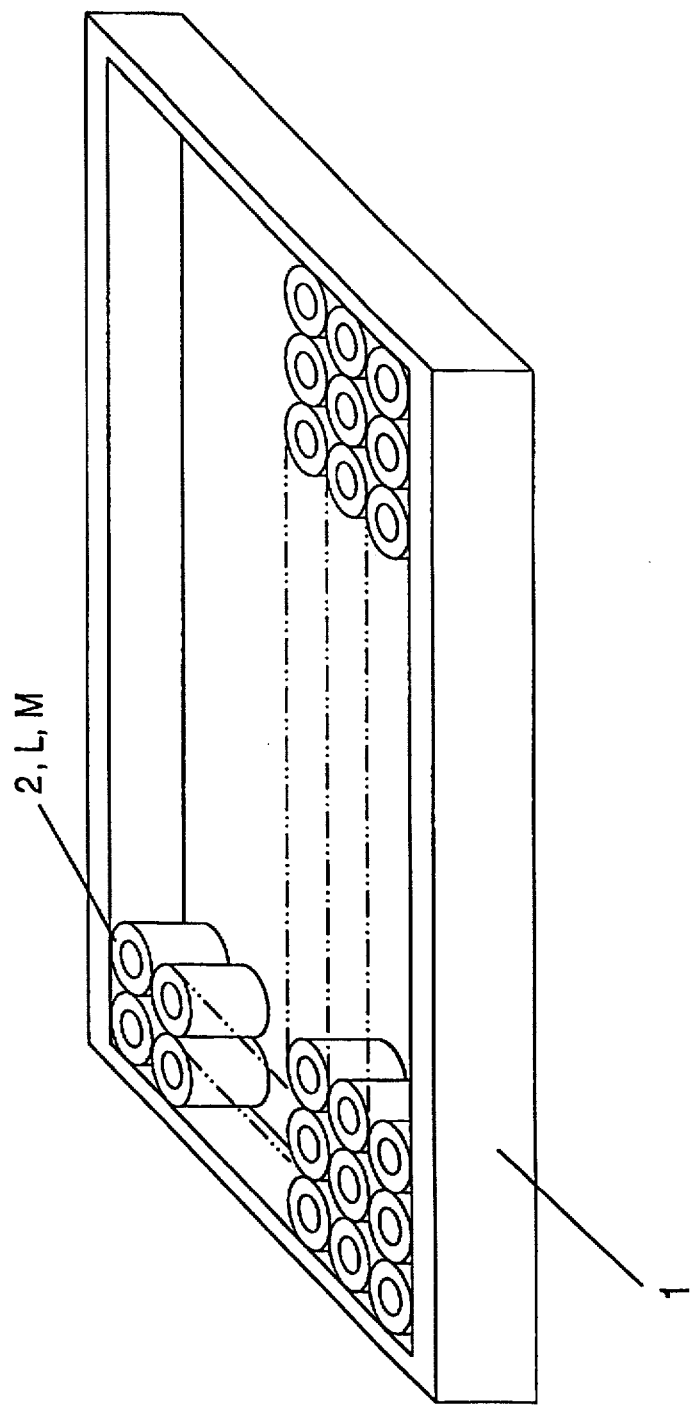
FIG. 3 shows a manner of germination acceleration in a nursery box.
Figure 4:
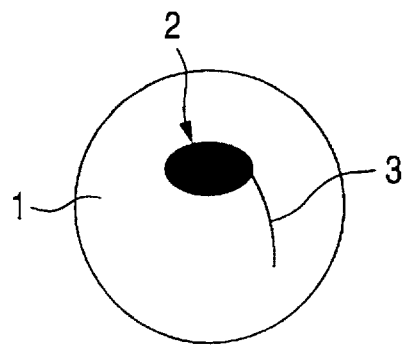
Figure 4:
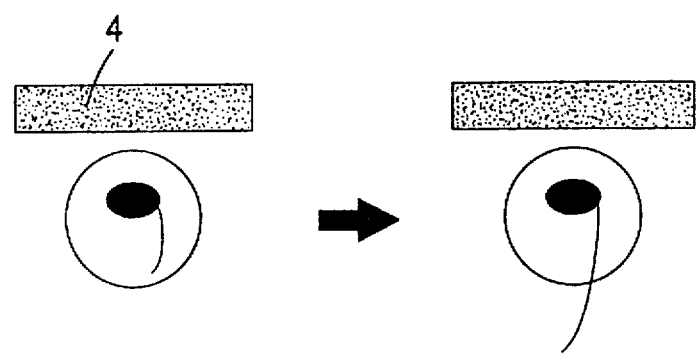
Figure 4:
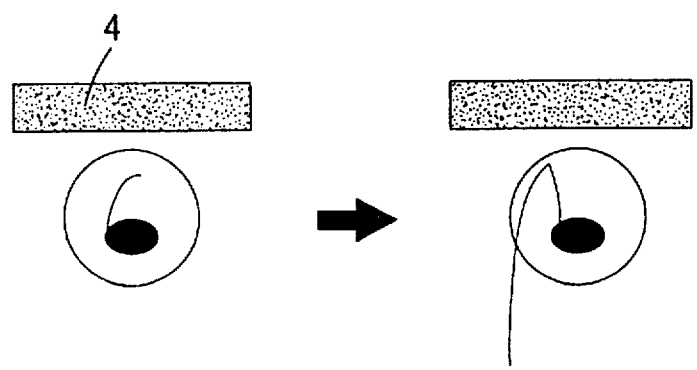

Separately, 400 hollow cylinders (designated auxiliary tools K) having an inner diameter of 9.5 mm and an outer diameter of 20 mm, and a height of 25 mm were prepared using a phenolic resin foamed block (trade name: OASIS), and one gelcoated seed (I) was put in each auxiliary tool K at a height of 10 mm from the bottom end of the cylinder (the center of gelcoated seed (I) was positioned 15 mm high from the bottom of the cylinder). The auxiliary tools K were placed in a nursery box as shown in FIG. 3 and subjected to germination acceleration at 22° C for 24 hours. Thereafter, the auxiliary tools K each containing one germinated gel-coated seed (I) were planted in horticultural soil in a tray to such a depth that the upper end thereof was slightly covered with soil (Example 2).

For comparison, 400 uncoated seeds of Japanese burdock were similarly put in the auxiliary tools, subjected to germination acceleration, and planted (Comparative Example 2).

All the trays were put in an incubator set at 22° C., and the number of the buds appearing above the soil was counted with time. The results obtained are shown in Table 1 below.

TABLE 1

| | Number of Buds | | | | | |
|---|---|---|---|---|---|---|
| | The Number of Days After Planting | | | | | |
| | 1 | 2 | 3 | 4 | 5 | 6 |
| Example 1 | 364 | 389 | 390 | 391 | 391 | 391 |
| Example 2 | 352 | 385 | 392 | 393 | 391 | 391 |
| Comparative Example 1 | 286 | 368 | 372 | 376 | 382 | 392 |
| Comparative Example 2 | 0 | 72 | 371 | 384 | 384 | 384 |

The results in Table 1 show that the gel-coated seeds planted according to the method of the invention produce a bud sooner and grow to seedlings with satisfactory uniformity.

EXAMPLES 3 AND 4 AND COMPARATIVE EXAMPLE 3

Gel-coated seeds (II) of Japanese burdock were prepared in the same manner as for gel-coated seeds (I) (diameter: 10 mm).

Four hundred auxiliary tools L and 400 auxiliary tools M were prepared using the same material as used in Example 2. Auxiliary tools L were hollow cylinders having an outer diameter of 20 mm, a height of 25 mm, an upper inner diameter of 9.5 mm from the top end to a depth of 20 mm, and a lower inner diameter of 5 mm from the bottom end to a height of 5 mm. Auxiliary tools M were columns with its center hollowed like a cup; the outer diameter of the column was 20 mm, the inner diameter of the hollow was 9.5 mm, and the depth of the hollow was 20 mm.

One gel-coated seed (II) was put in each of 400 auxiliary tools L (Example 3) and 400 auxiliary tools M (Example 4) at the position where the inner diameter of the hollow portion changed in the former tools and at the bottom of the hollow in the latter tools. The position of the center of the gel-coated seed (II) corresponded to a height of 10 mm from the bottom of the tool.

Auxiliary tools L and M each containing one gel-coated seed (II) 2 were arranged in nursery box 1 as shown in FIG. 3, subjected to germination acceleration at 22° C. for 24 hours, and then buried in horticultural soil in a tray to such a depth that the upper end thereof was slightly covered with soil.

For comparison, 400 gel-coated seeds (II) were subjected to germination acceleration at 22° C. for 24 hours and planted in horticultural soil in a tray with the tip of the root facing at random (Comparative Example 3).

All the trays were placed in an incubator set at 22° C., and the number of the buds appearing above the soil in Examples 3 and 4 was counted with time. The results obtained are shown in Table 2 below.

TABLE 2

| | Number of Buds | | | | | |
|---|---|---|---|---|---|---|
| | The Number of Days After Planting | | | | | |
| | 1 | 2 | 3 | 4 | 5 | 6 |
| Example 3 | 356 | 381 | 391 | 392 | 390 | 390 |
| Example 4 | 351 | 381 | 390 | 391 | 391 | 391 |

It is seen from Table 2 that both the gel-coated seeds planted as put in auxiliary tools L and those planted as put in auxiliary tools M grow with satisfactory uniformity.

On the other hand, all the plants of Examples 3 and 4 and Comparative Example 3 were dug up to examine any deformation of the root crops. The proportion of those crops which were observed suffering from deformation in all the crops harvested is shown in Table 3 below.

TABLE 3

| | Proportion of Deformed Crops |
|---|---|
| Example 3 | 0% |
| Example 4 | 7% |
| Comparative Example 3 | 1% |

The results in Table 3 show that all the crops of Example 3, in which hollow cylindrical auxiliary tools L were used, suffered from no deformation, proving superior to those of Comparative Example 3, in which the seeds were planted randomly.

On the other hand, where cup-like auxiliary tools M are used for planting root crops as in Example 4, although the uniformity of seedlings is satisfactory as shown in Table 2, the rate of deformation increases over Example 3. It is thus seen that the form of an auxiliary tool to be used for planting root crops should be selected properly.

As apparent from the results in the above described Examples, the planting method according to the invention makes it possible to take advantage of growth of the root effectively and to let the root strike out of the gel coat in the least time. As a result, when a large number of gel-coated seeds are planted in this way, the seeds will grow uniformly to provide seedlings having a regular height, and full-grown crops could be harvested at a time, affording an improved productivity per labor unit. In planting root crops, the growing root is prevented from deformation, which would lessen the commercial value of the resultant crop, by properly selecting the form of the auxiliary tool.

While the invention has been described in detail and with reference to specific examples thereof, it will be apparent to one skilled in the art that various changes and modifications can be made therein without departing from the spirit and scope thereof.

What is claimed is:

1. A method of planting gel-coated seeds wherein the method comprises putting gel-coated seeds in an auxiliary tool of a hollow post form whose top and bottom can be specified in such a manner that the seed does not rotate therein, subjecting the seed to germination acceleration in making the seeds sprout a root, and then sowing the seeds with the tip of the root facing downward while maintaining top-to-bottom relation in said auxiliary tool.

2. The method as claimed in claim 1, wherein said auxiliary tool has a hollow cylinder form, and the inner diameter of at least one end of said cylinder is smaller than the diameter of the gel-coated seed to be put in.

3. The method as claimed in claim 1, wherein said auxiliary tool is made of a decomposable material.

\* \* \* \* \*